United States Patent [19]

Tanabe

[11] Patent Number: 5,101,284
[45] Date of Patent: Mar. 31, 1992

[54] SHADING CORRECTIONS DEVICE WITH WHITE COLOR REFERENCE MEMBER PERIPHERALLY PROVIDINED PROXIMATE TO A PLATEN ROLLER FOR FEEDING AN ORIGINAL DOCUMENT OVER A GLASS PLATEN

[75] Inventor: Eiichi Tanabe, Kanagawa, Japan

[73] Assignee: Fuji Xerox Co., Ltd., Tokyo, Japan

[21] Appl. No.: 574,728

[22] Filed: Aug. 30, 1990

[30] Foreign Application Priority Data

Aug. 31, 1989 [JP] Japan .................................. 1-227194

[51] Int. Cl.$^5$ .......................... H04N 1/10; H04N 1/12
[52] U.S. Cl. ..................................... 358/461; 358/494; 358/496; 358/498
[58] Field of Search ............... 358/474, 494, 496, 498, 358/461; 555/308, 50, 75

[56] References Cited

U.S. PATENT DOCUMENTS 4,970,606 11/1990 Shima ..................................... 358/474

Primary Examiner—Benjamin R. Fuller
Assistant Examiner—Scott A. Rogers
Attorney, Agent, or Firm—Finnegan, Henderson, Farabow, Garrett and Dunner

[57] ABSTRACT

In a shading correction device of an image reading machine, for example, a Xerography unit or a thermal transfer unit, a platen roller is provided so as to engage and disengage from a platen glass. A reference white color member is provided. The reference white color member is movable up to a position between the platen glass and the platen roller along the circumferential side of the platen roller and with rotation of the platen roller.

8 Claims, 4 Drawing Sheets

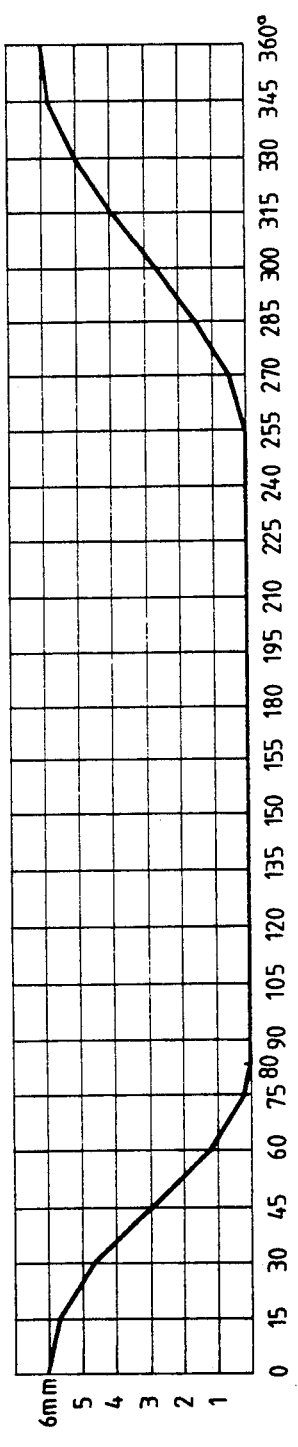
FIG. 3(a) NO. 1
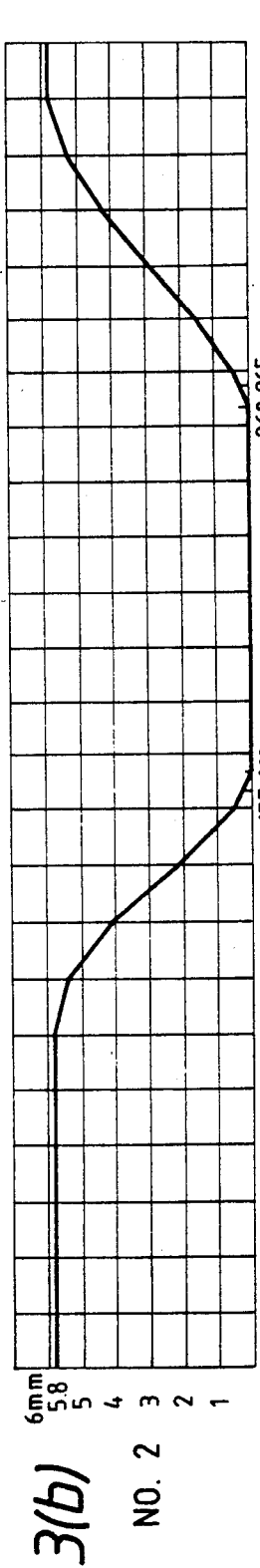
FIG. 3(b) NO. 2
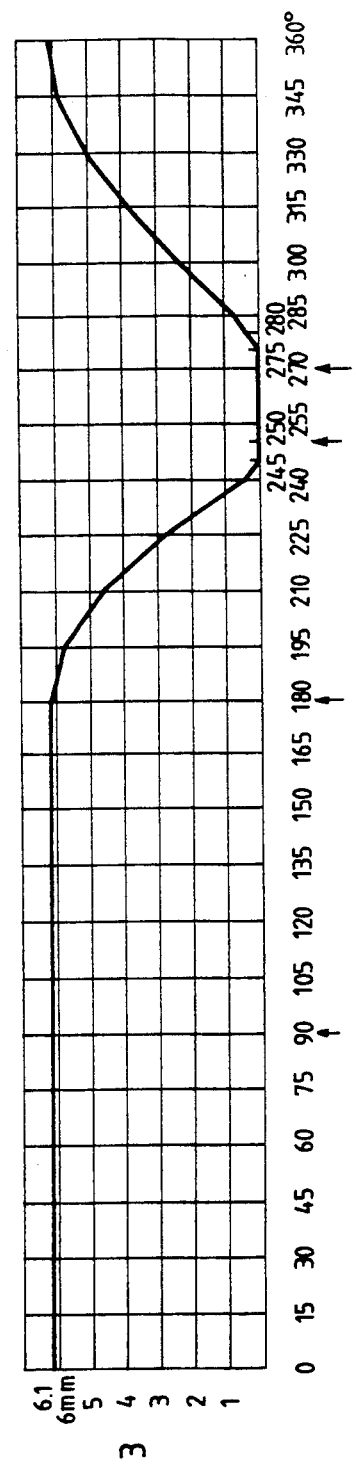
FIG. 3(c) NO. 3

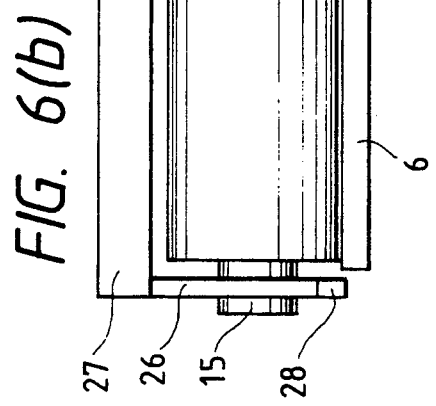
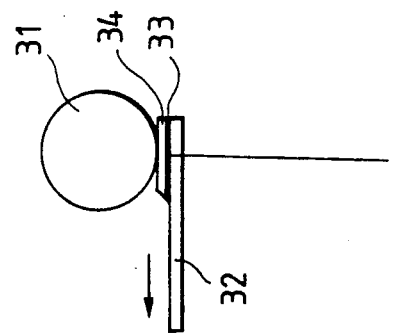
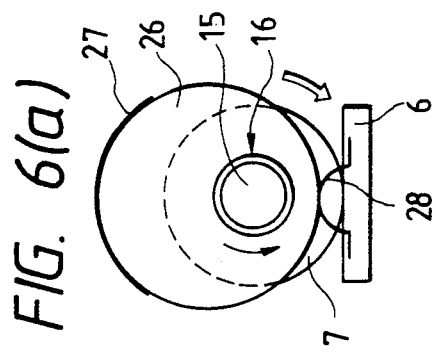
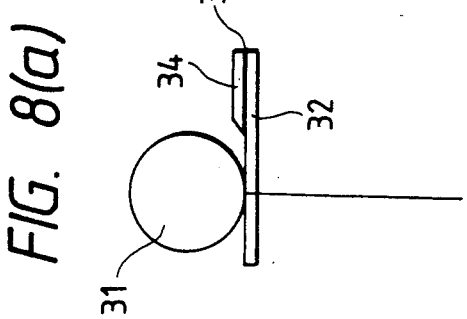
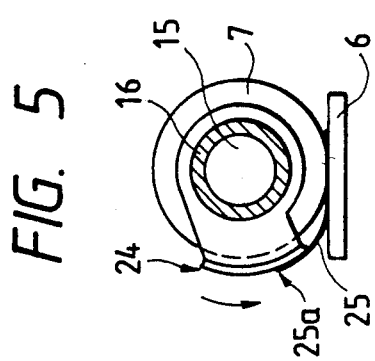
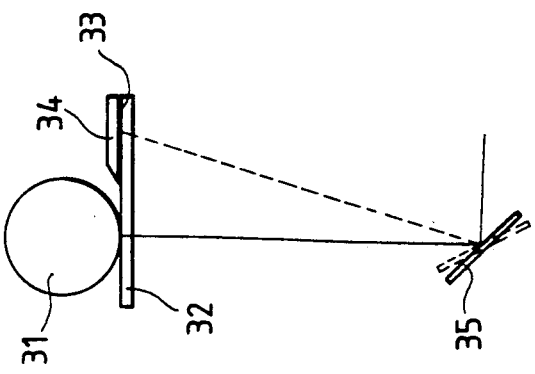

SHADING CORRECTIONS DEVICE WITH WHITE COLOR REFERENCE MEMBER PERIPHERALLY PROVIDINED PROXIMATE TO A PLATEN ROLLER FOR FEEDING AN ORIGINAL DOCUMENT OVER A GLASS PLATEN

BACKGROUND OF THE INVENTION

The present invention relates to an image reading device for use with a digital copying machine, for example, and more particularly to an image reading device with a shading correction device.

In the digital copying machine, an original is placed on a platen glass located on the top of the base machine. Pictorial information on the original is read by an image sensor of an image reading device and converted into image signals. The image signals are appropriately processed, and are outputted in the form of a reproduced picture on paper by means of a Xerography unit or a thermal transfer unit contained in the base machine.

An original is linearly illuminated by a line light source, such as a fluorescent lamp. Reflected light from the original is linearly read by a line sensor. It is ideal that light from the light source be uniformly distributed over the entire width of the original. In actual cases, however, the distribution is not uniform, because variations in the light light emitting characteristics of the fluorescent lamps inevitably exist, and optical paths are changed. Nonuniform distribution of light causes shading, i.e., irregularity of optical density appearing on the read image.

It is, for this reason that a shading correction unit is used for the image reading device of this type. To make a shading correction, a reference white color plate is read before reading an original image. Levels of image signals derived from the image sensor when the white color plate is read are stored as correction data. The correction data are used as correcting levels for the image signals gathered when an original is actually read. In this way, the shading of an output image is corrected.

The image reading device with the shading correction typically comes in two varieties; a fixed original type and a moving original type. For reading an image on a large size original, the moving original type is introduced normally as that of the image reading device. The reason for this is that, if the image reading device of the fixed original type is introduced, the largest size of the original that can be handled is limited by an area of the platen glass.

In the image reading device of the moving original type, the platen glass used is rectangular in shape, and wider than the original but is shorter than the original as viewed in a direction carrying the original. The original is nipped between the platen glass and the platen roller. An image on the original is read through the platen glass, while being moved by the platen roller. Many conventional shading correction units adaptable for the image reading device of the moving original type are known. In one of those known units, a white color member is used for the platen roller, and the roller per se is a reference white color plate.

This type of the shading correction unit involves some problems to be solved. The material quality required for the platen roller that must reliably carry the original, while satisfactorily pressing the original against the platen glass, does not satisfy a requirement for the reference white color plate. The best compromise that has been taken for the contradictory requirements is that either of the functions of the platen roller and the reference white color plate is sacrificed; when the platen roller-satisfactorily functions, the reference white color plate functions unsatisfactorily, and vice versa. Thus, it is impossible to simultaneously obtain satisfactory mechanical characteristics to carry the original and satisfactory optical characteristics for shading correction.

The platen roller rotates while constantly pressing the original against the platen glass. Therefore, it is apt to become contaminated. The contaminated platen roller unsatisfactorily exercises its function.

To cope with the problem, there is a proposal in which a reference white color plate 33, as shown in FIG. 7, is disposed near the image reading area on the upper surface of a platen glass 22 with which a platen roller 31 is to engage. The white color plate 33 is covered with a protecting member 34. In operation, an optical path for reading image (as indicated by a solid line) or another optical path for reading reference white color (as indicated by a broken line) is selected by a movable mirror 35. This proposal needs an additional optical system near the platen glass, and a space for the optical system installation. In this respect, a design freedom for the image reading device is limited. The protecting member 34, which is for the white color plate, is obstructive in transporting the original That is, it may cause improper original carriage or a variation in the original carrying speed.

To solve this problem, the white color plate may be placed on the underside of the platen glass 32. In this case, the white color plate is located out of the focused surface, and the platen glass is not involved in the image reading operation. Therefore, the conditions for reading the white color plate are different from those for the image reading. The difference of the conditions leads to inexact image reading. An additional, disadvantage involved is that heat from a heat source often changes the white color plate to a yellowish color.

There is another approach to solve the platen roller contamination problem, as shown in FIGS. 8(a) and 8(b), the platen glass 32, together with the white plate 32, is movable a small distance in a carrying direction of the original. Before reading an original image, the white color plate, as shown in FIG. 8(b), is read by moving the platen glass 32 in the arrowhead direction so that the white color plate 33 comes right under the platen roller 31. To read an original, the platen glass 32 is moved so that the white color plate 33 retracts the optical path, as shown in FIG. 8(a).

The approach requires a complicated mechanism to move the platen glass 32 and a space for installing it. Where the white color plate 33 is disposed on the upper surface of the platen glass 32 as shown in FIG. 8(b), the platen roller possibly rides on the protecting member 34 covering the white color plate 33. If it rides on the protecting member, the platen roller 31 must be positioned correctly.

SUMMARY OF THE INVENTION

Accordingly, an object of the present invention is to provide an image reading device which can make an exact shading correction with a simple structure.

To achieve the above object, there is provided a shading correction device characterized in which a platen roller is provided so as to engage and disengage from a platen glass, and a reference white member is provided, the reference white member being movable between the platen glass and the platen roller along the circumferential side of the platen roller and with rotation of the platen roller.

The reference white color member is coaxially coupled with a shaft of the platen roller with a one way clutch interposing therebetwaen, and the one-way clutch is directed so as to transfer a rotating force to the reference white color member when the platen roller is rotated in the direction opposite to a carrying direction of the original. With such an arrangement, the reference white color member automatically moves up to a position between the platen glass and the platen roller, with the reverse rotation of the platen roller. A sheet of low rigidity that is mounted to the correction plate hold bracket mounted on the one-way clutch, may be used for the reference white color member. This feature improves a degree of close contact of the reference white color member with the platen glass.

An operation of the present invention will be described using a specific example and with reference to FIG. 1.

In the present invention, a reference white color member 4 is coaxially coupled with a platen roller 2 that is provided so as to engage and disengage from a platen glass 1, with a one-way clutch 3 interposing therebetween.

In an initial state, the platen roller 2 disengages from the platen glass 1. The reference white color member 4 is positioned on the side of the platen roller 2 as indicated by a two-dot chain line. In reading an image from an original, the platen roller 2 is first turned, in the direction (arrowhead direction B) opposite to an carrying direction of the original (arrowhead direction A). With the turn of the platen roller, the reference white color member 4 also turns and is positioned between the platen roller 2 and the platen glass 1. Then, the platen roller 2 is moved in the direction of arrow C, so that the reference white color member 4 is made to closely contact the platen glass 1 as indicated by a solid line. Under this condition, the original image is read to provide a reference white signal for shading correction.

Next, the platen roller 2 is lifted in the direction opposite to the direction of arrow C, and the platen roller 2 is turned in a carrying direction of the original. With the reverse turn, the reference white member 4 is pulled, by means of a spring (not shown) or the like, out of the position between the platen roller 2 and the platen glass 1, and is returned to an original position. At the same time, an original (not shown) is nipped between the platen roller 2 and the platen glass 1. Then, the original image is read while being transported by the platen roller 2. At this time, the reference white color member 4 will turn together with the platen roller 2, but its turning force is absorbed by the one-way clutch 3 and the reference white color member 4 stays there.

The image signals thus gathered are subjected to a shading correction on the basis of the reference white signal previously obtained.

Other objects, features and advantages of the invention will be apparent from the following description taken in connection with the accompanying drawing, in which:

BRIEF DESCRIPTION OF THE DRAWINGS

FIG. 3(a-c) shows graphs useful in explaining the profiles of the cams to drive the rollers;

FIG. 5 shows a side view of a key portion of a shading correction device according to another, embodiment of the present invention;

FIGS. 6(a) and 6(b) are a side view and a front view showing a key portion of yet another embodiment of a shading correction device according to the present invention;

FIG. 7 is a diagram showing a scheme a conventional image reading device; and

FIGS. 8(a) and 8(b) show diagrams showing another conventional image reading device.

DETAILED DESCRIPTION OF THE PREFERRED EMBODIMENTS

Some specific embodiments of an image reading device according to the present invention will be described with reference to the accompanying drawings.

Figure 1:
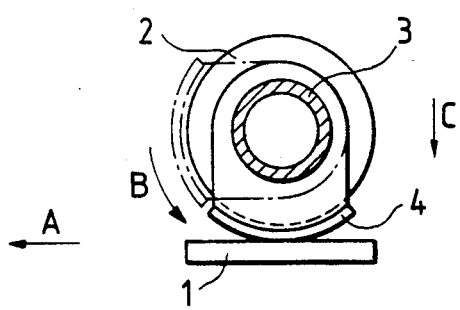
FIG. 1 shows a side view of a key portion of an shading correction device according to the present invention, which is for explaining an operation of the shading correction.
Figure 2:
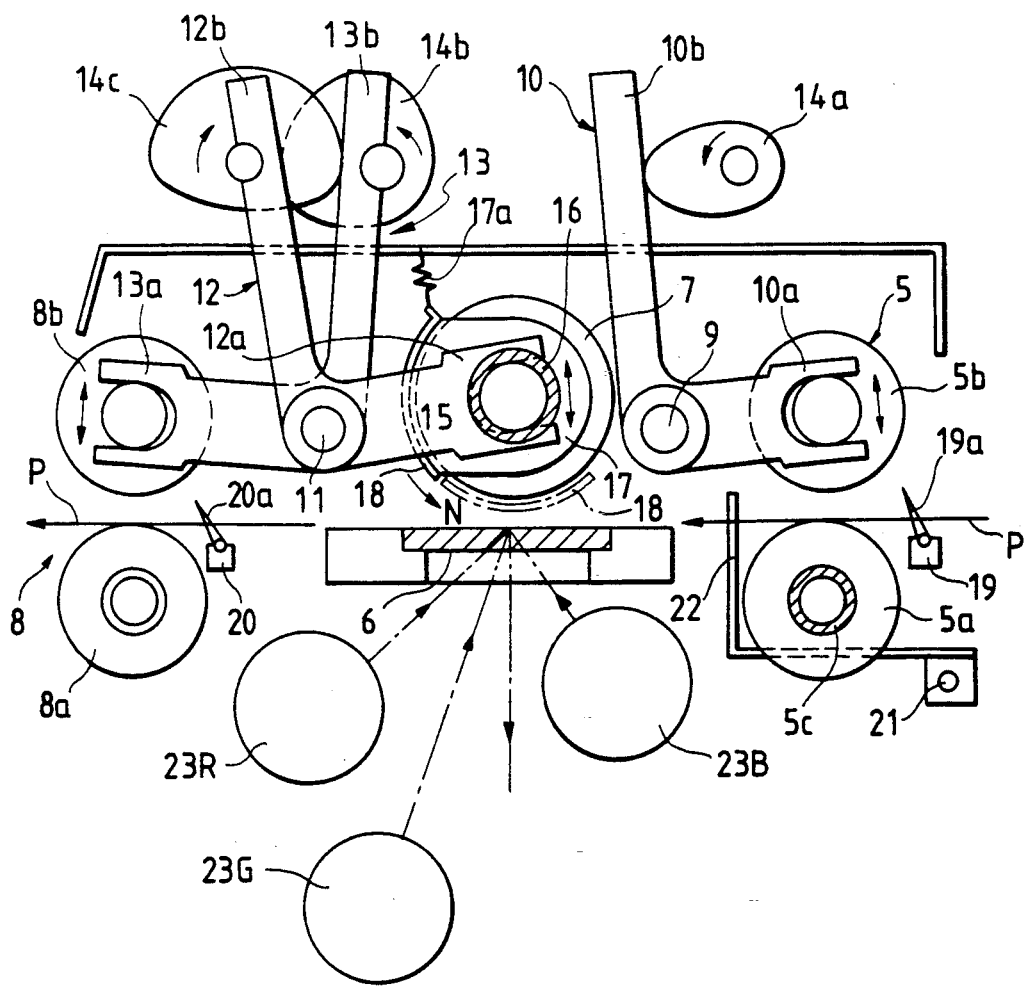
FIG. 2 is sectional view showing the shading correction device according to an embodiment of the invention.

FIG. 2 is a side view showing an embodiment of an image reading device according to the present invention.

As shown, the image reading device is made up of a pair of carrying rollers 5 including a drive roller 5a and a pinch roller 5b, a platen glass 6, a platen roller 7 to be in press-contact with the platen glass 6, and a pair of carrying rollers 8 including a drive roller 8a and a pinch roller 8b. The carrying roller 5 is located closer to the input or insert-side of the image reading device. The carrying roller 8 is located closer to the output or exit-side of the device.

The pinch roller 5b is rotatably supported at a first end 10a of a first arm 10 shaped like an "L" letter which can swing around a shaft 9. The platen roller 7 and the pinch roller 8b are mounted so as to be able to swing at the first ends 12a and 13a of second and third arms 12 and 13, which are also L-shaped, and are able to swing about a shaft 11 in the opposite direction. The second ends 10b, 12b, and 13b of the first to third arms 10, 12, and 13 are in press contact with cams 14a to 14c having predetermined profiles.

A rotating force of a cam motor (not shown) is transmitted, by a power transmission unit (not shown), to the cams 14a to 14c. Those cams turn at the same angles in synchronism with one another.

When the cam motor turns in the forward direction, the first and second cams 14a and 14b turn counter-clockwise, while the third cam 14c turns clockwise. With the synchronized turns of those cams 14a to 14c, the pinch roller 5b, platen roller 7, and the pinch roller 8b move up and down in the direction of arrows.

FIGS. 3(a) to 3(c) are graphs showing relationships between the height of the bottoms of the pinch rollers 5b, 7, and 8b as measured from the platen surface (i.e., a plane flush with the surface of the platen glass 6), when no original is present on the platen, and the rotating angles of the cams 14a to 14c, respectively. As shown, when the original is absent, the insert-side pinch roller 5b is in contact with the platen surface in the range of 8° to 255° of cam angle. The platen roller 7 is in contact with the platen glass 6 in the range of 160° to 260°. The exit-side pinch roller 8b comes in contact with the platen surface in the range from 245° to 212°.

A correction plate hold bracket 17 is coupled with a shaft 15 of the platen roller 7, with a one-way clutch 16 interposing therebetween. A shading correction plate 18, which is semicirclar in cross section, is mounted on the bracket 17. The correction plate 18 is arranged such that a reference white color paper having a 100 μm thickness passes along the surface of a plate-like member of high rigidity, such as soft iron of 1.6 mm thickness. The correction plate serves as a reference white color plate of uniform reflecting characteristic. The one-way clutch 16 is directed such that when the platen roller 7 turns in the arrowhead direction N, viz., in the direction opposite to the carrying direction of the original, the correction plate hold bracket 17 turns together with the platen roller. The bracket 17 is pulled by a spring 17a so as to turn in the direction that is the forward turning direction of the platen roller 7. Also in the direction, the bracket 17 is separated away from the platen glass 6.

A sensor 19 for sensing an original as inserted is disposed at the inlet of the roller pair 5 on the original carrying path. Another sensor 20 for sensing the original as discharged is disposed at the input of the roller pair 8. A gate 22 is disposed near the output of the carrying roller pair 5. When driven by a gate solenoid (not shown), the gate 22 is swung about a shaft 2, to project to the original carrying path P and retract therefrom. In this instance, the gate solenoid is of the latch type. In response to a negative pulse applied, the solenoid places the gate 22 in the projected state. In response to a positive pulse, it places the gate 22 in the retracted state.

Three exposure lamps 23R, 23G, and 23B are disposed under the platen glass 6. Those lamps illuminate an original, through the platen glass 6. The reflected light from the original enters an imaging optical section including mirrors, lenses, image sensor, etc., through the platen glass 6 again.

Figure 4:
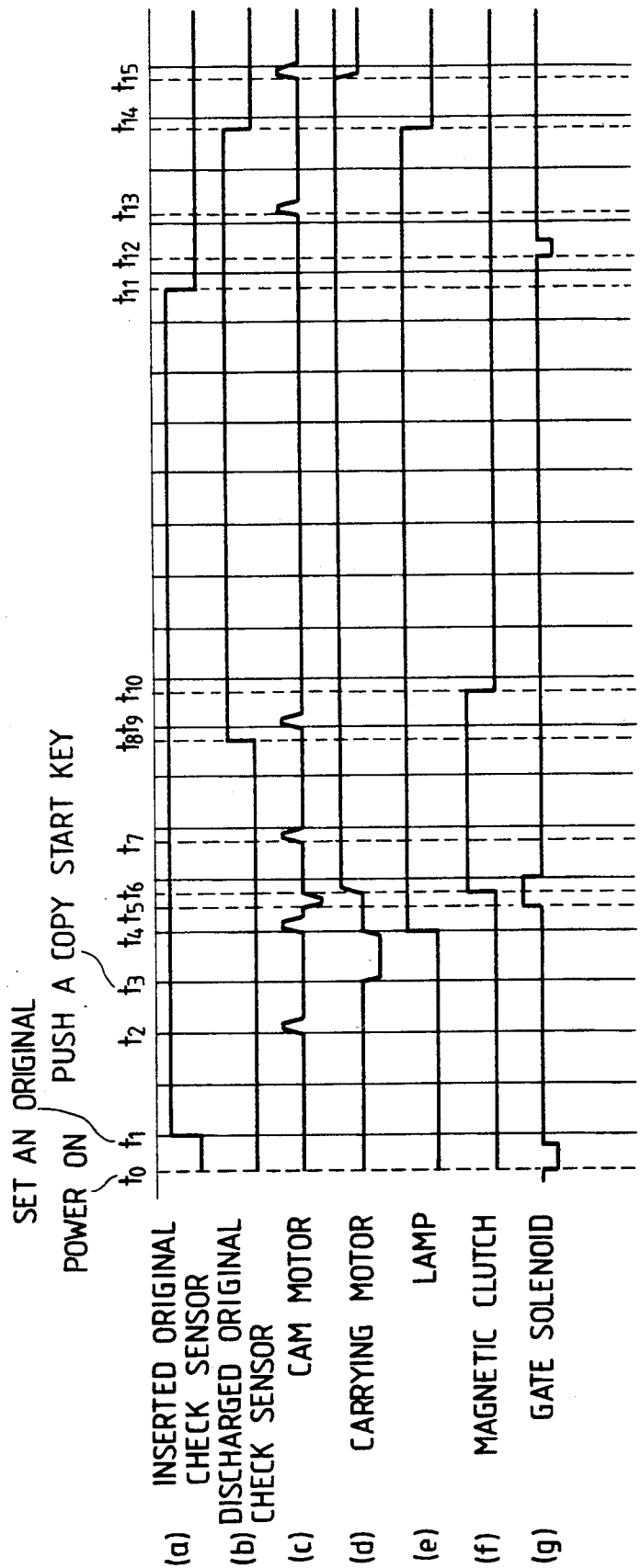
FIG. 4 shows a timing chart useful in explaining the operation of the image reading device.

An image on an original is read by the image reading device thus structured. An original to be read is an original of large size, called a design board, having a thickness of 4 mm and the size of A4. A timing chart shown in FIG. 4 will be used for the description.

As shown in FIG. 4(g), at time point $t_0$ of power on, a negative pulse is applied to a gate solenoid (not shown) to drive the gate 22. In response to this pulse, the gate 22 is held projecting to the original carrying path P.

Then, an original is inserted into the image reading device. In an initial state, the angles of the cams 14 to 14c are 0°. Under this condition, as seen from FIGS. 3(a), 3(b), and 3(c), all of the three rollers 5b, 7, and 8b float approximately 6 mm from the platen surface. The lead edge of the original of 4 mm thick passes between the drive roller 5a and the pinch roller 5b of the insert side carrying roller pair 5, pushes the actuator 19a of the sensor 19, and then hits the gate 22 to come to stop. The lead edge of the original is sensed by the sensor 19 (time point $t_1$ in FIG. 4(a)). After a predetermined time (time point $t_2$ in FIG. 4(c)) since the sensing of the original lad edge, the cam motor is driven and starts to turn forwardly so that the first and second cams 14a and 14b are driven counterclockwise in FIG. 2, and the third cam 14c is turned clockwise. As shown in FIG. 3(a), the pinch roller 5b starts to fall according to the profile of the first cam 14a. It falls up to the height of 4 mm, and hits the original. The original is held between the pinch roller 5b and the drive roller 5a.

The cam motor further continues to rotate. Since the lowest position of the pinch roller 5b is limited by the thickness of the original, however, the first arm 10 supporting the pinch roller 5b separates from the cam 14a. The cams 14a to 14c turns by 90° from a reference angle, and then the cam motor stops. The cam motor used in this instance is a stepping motor which turns by an angle proportional to the number of drive pulses supplied. A waveform shown in FIG. 4(c) shows an envelope of the drive pulse signal. In the waveform, the up direction indicates the forward drive; the down direction, a reverse drive; the width of the waveform corresponds to the number of drive pulses.

A copy start button installed on an operation panel of a copying machine, for example, is pushed (time point $t_3$). Then, as shown in FIG. 4(d), the carrying motor turns in the reverse direction to the carrying direction of the original. At this time, the magnetic clutch 5c coupled the drive roller 5a remains turned off, as shown in FIG. 4(f). Accordingly, the drive roller 5a is not turned and no force is applied to the original. The carrying motor is also a stepping motor and the waveform shown in FIG. 4(d) have the same meanings as those of that of FIG. 4(c). With the reverse turn of the carrying motor, the platen roller 7 also reversely turns. This turn is transferred through the one-way clutch 16 to the correction plate hold bracket 17 which in turn turns in the same direction. With the turning of the bracket, the shading correction plate 18 mounted on the bracket 17 moves to under the platen roller 7, i.e., a correction position. When the shading correction plate 18 reaches a place between the platen roller 7 and the platen glass 6, the reverse turn of the carrying motor is stopped (time point $t_4$). Afterwards, the cam motor is forwardly driven to turn the cams 14a to 14c from the reference angle to 180°. At this cam angle, as seen from FIG. 3(b), the platen roller 7 is allowed to fall up to the lowest position. Accordingly, the shading correction plate 18 is put into press contact with the surface of the platen glass 6. At the same time, the exposure lamps 23R, 23G, and 23B are lit on, as shown in FIG. 4(e). Under this condition, the lamps 23R, 23G, and 23B illuminate the shading correction plate 18. The reflected light passes through the platen glass 6, and is formed an image on the image sensor through the mirror and lens (not shown). An image signal from the image sensor is transferred to a signal processor (not shown) where is subjected to the pre-processing for the shading correction.

The shading correction plate 18 is the reference white plate. Levels of the image signals as read must be uniform over the entire width of the image sensor. Hence, if the signal levels are not uniform, the amounts of lights emitted from the lamps 23R, 23G and 23B are considered to be not uniform as viewed in the length direction of the lamps. Therefore, the shading correction of an output image can be made in a manner that the levels of the image signals read from the shading correction plate 18 are stored as correction data, and the levels of signals as actually read from an original are corrected by using the correction data.

At the completion of the pre-processing for the shading correction (at time point $t_5$), the cam motor is then reversely turned, so that the cams 14a to 14c is put back to a position of 90° as counted from the reference angle. Accordingly, the platen roller 7 separates from the surface of the platen glass 6, and rises to the highest position again. At this time, the insert side drive roller 5a is left in press contact with the original. At the same time, as shown in FIG. 4(g), a positive pulse is applied to the gate solenoid (not shown), so that the gate 22 retracts from the original carrying path P.

When the rising of the platen roller 7 ends (time point $t_6$), as shown in FIG. 4(d), the carrying motor is forwardly driven, and as shown in FIG. 4(f), the magnetic clutch 5c coupled with the insert side roller pair 5 is powered on. Accordingly, the drive roller 5a starts to turn in the forward direction, and the original is carried beyond the position of the gate 22, while being nipped between the drive roller 5a and the pinch roller 5b. At this time, the platen roller 7 also turns in the forward direction. Then, the shading plate 18 pulled by the spring 17a swing to the right and to return to the original position.

The leading edge of the original reaches a position between the platen roller 7 placed at the raised position and the platen glass 6, at time point $t_7$. At this time, the cam motor turns forwardly, and when it turns 180°, it stops its turning. With this turn, the platen roller 7 falls according to the profile of the second cam 14b, and comes in contact with the original at the height of 4 mm, and is nipped between the platen roller 7 and the platen glass 6. The original is carried downstream by means of the platen roller 7 and the insert side carrying roller pair 5, while the original is put into press contact with the platen glass 6 by the platen roller 7.

At this time, an image on the original is under illumination by the lamps 23R, 23G, a 23B, with the platen glass 6 being interposed therebetween. The reflected light from the original is imaged on the image sensor, and the image reading from the original sequentially progresses. The image signal from the image sensor is supplied to the signal processor where the processing of the shading correction, for example, is executed.

The original is further advanced, and the leading edge of the original hits the actuator 20a of the exit sensor 20, and pushes it down. When the sensor 20 is turned on as shown in FIG. 4(b) (time $t_8$), the cam motor starts to operate again after a predetermined time (time point $t_9$). The motor turns up to 250°, and stops. With the turn of the cam motor, the exit side pinch roller 8b falls to the height of 4 mm according to the profile of the third cam 14c, and comes in contact with the original. Finally, the original is nipped between the pinch roller 8b and the drive roller 8a. In this way, the reading of the original progresses while the original being nipped by the insert-side carrying roller pair 5, platen roller 7, and the exit-side carrying roller pair 8, is carried. After a preset time (time point $t_{10}$) from time point $t_9$, the magnetic clutch 5c of the roller pair 5 is turned off. Subsequently, the original is carried by the platen roller 7 and the roller pair 8, and the insert-side carrying roller pair 5 is in a free rotation.

With further progress of the carrying of the original, the sensor 19 senses the trailing edge of the original, and is turned off as shown in FIG. 4(a) (time point $t_{11}$). Upon detection of the trailing edge, a negative pulse is applied to the gate solenoid (not shown) after a preset time (time point $t_{12}$) as shown in FIG. 4(g), and the gate 22 is projected and interrupt the original carrying path P, again. After a preset time (time point $t_{13}$) from the sensing of the trailing edge of the original, the cam motor is turned forwardly and when turned up to 265°, it comes to stop. This rotation pulls up the lowest position of the pinch roller 5b and the platen roller 7, according to the profiles of the first and second cams 14a and 14b, and slightly separates from the platen surface. As a result, the image reading device is free from the following problem. When the trailing edge of the 4 mm-thick original emanates from the platen roller 7, the platen roller 7 of metal drops on the platen glass 6, generating noisy sound or breaking the platen glass 6.

The original is further carried, and the trailing edge of e original is sensed by the exit sensor 20 (time point $t_{14}$). At this time, as shown in FIG. 4(e), the exposure lamps 23R, 23G, and 23B are lit off, and after a preset time ($t_{15}$), the cam motor is forwardly driven, and turns up to 0°, and comes to stop. As the result of the turning of the motor, three rollers 5b, 7, and 8b are all put back to the position furthest from the platen surface, according to the profiles of the first to third cams 14a to 14c.

Here, the original read operation is completed. As recalled, the plate-like member of high rigidity is used for the shading correction plate 18 in the above-mentioned embodiment. Alternatively, the shading correction plate 18 may be constructed such that as shown in FIG. 5, a reference white color sheet is pasted over a resilient substrate of low rigidity as a phosphorous bronze plate of 0.2 mm thick, which is applied to a part of the correction plate hold bracket 24, and a base end 25a is mounted on the bracket 24. When the pinch roller 7 is separated from the platen glass 6, the pinch roller 7 is turned in the direction of arrow. By the turn of the pinch roller, the correction plate hold bracket 24 is also turned in the same direction, through the one-way clutch 16, thereby to position only the shading correction plate 25 between the platen glass 6 and the pinch roller 7. Then, the pinch roller 7 is made to fall, so that the shading correction plate 25 is made to press contact the platen glass 6. Since the shading correction plate 25 is resilient, a close contact of it with the platen glass 6 is ensured. Consequently, an exact shading correction is guaranteed. In the case where the reference white sheet is resilient, the reference white sheet per se may be used as the shading correction plate.

Another embodiment of the present invention will be described with reference to FIGS. 6(a) and 6(b).

An eccentric cam 26 is provided about the shaft 16 of the pinch roller 7, through the one-way clutch 16 interposing therebetween. The shading correction plate 27 is mounted on the eccentric cam 26. A push-up member 28 is in press contact with the eccentric cam 26.

In the initial state, the large diameter portion of the eccentric cam 26 is located in the upside, while the small diameter portion is in contact with the push-up member 28. Accordingly, the pinch roller 7 is at the down position and in press contact with the platen glass 6.

When the pinch roller 7 is turned in the direction of arrow, the eccentric cam 26 is also turned in the same direction by the one-way clutch 16. The large diameter portion of the cam comes in contact with the push-up member 28, so that the shaft 15 of the pinch roller 7 is pushed up. As a result, the pinch roller 7 is lifted from the platen glass 6, and the shading correction plate 27 mounted on the eccentric cam 26 is positioned between the platen glass 6 and the pinch roller 7. Under this condition, read of the shading correction plate 27 is allowed. In the embodiment shown in FIG. 6, the rotation of the shaft 15 of the pinch roller 7 is utilized for the force to lift the pinch roller from the platen glass 6. Therefore, there is no need for the mechanism including the cam driven by the drive source and the arm swung in contact with the cam as used in the embodiment of FIG. 2.

As seen from the foregoing description, the reference white color member for shading correction is put between the platen roller and the platen glass and pulled out of there, with the rotation of the platen roller. Because of this feature, there is no need for a drive force to move the reference white color member, that is specially provided. Accordingly, this feature simplifies the structure of the image reading device. It is noted that the reference white color member merely moves along the circumference of the platen roller. Accordingly, it little requires additional space. It is further noted that when the reference white color member moves, it will never contact another member. Because of this, the white color member may rarely be contaminated, and hence stable and exact shading correction is ensured for a long period of time.

While some specific embodiments of the invention have been described, it should be understood that the present invention is not limited to the embodiments, but may variously be changed, modified and altered within the scope of the appended claims.

What is claimed is:

1. A shading correction device for correcting shading of an image copied from an original on a platen glass on a copy machine, said shading correction device comprising:
    a platen roller provided adjacent to said platen glass for carrying said original in a predetermined direction whereby said original engages with or disengages from said platen glass; and
    a reference white color member peripherally provided proximate said platen roller, said reference white color member being movable to a position between said platen glass and said platen roller in response to rotating of said platen roller.

2. The shading correction device according to claim 1, further comprising one-way clutch means for coaxially coupling a shaft of said platen roller with said reference white color member.

3. The shading correction device according to claim 2, wherein said one-way clutch means transfers a rotating force to said reference white color member upon rotation of said platen roller in a direction opposite said predetermined carrying direction.

4. The shading correction device according to claim 2, further comprising holding bracket means mounted on said one-way clutch for holding said reference white color member.

5. The shading correction device according to claim 4, further comprising spring means for pulling said reference white color member in the direction opposite said predetermined carrying direction.

6. The shading correction device according to claim 4, wherein said reference white color member comprises a sheet having low rigidity, a base end of said sheet being mounted on said holding bracket means.

7. The shading correction device according to claim 3, further comprising;
    an eccentric cam mounted on said one-way clutch means for holding said reference white color member at a large diameter portion of said eccentric cam, and
    a push-up member provide on at least one side of said platen glass and engaging said eccentric cam.

8. The shading correction device according to claim 7, further comprising spring means for pulling said reference white color member in the direction opposite said predetermined carrying direction.

* * * * *

UNITED STATES PATENT AND TRADEMARK OFFICE
CERTIFICATE OF CORRECTION

PATENT NO. : 5,101,284
DATED : March 31, 1992
INVENTOR(S) : Eiichi Tanabe

It is certified that error appears in the above-indentified patent and that said Letters Patent is hereby corrected as shown below:

Claim 1, column 9, line 26, change "on" (second occurence) to --of--.

Claim 1, column 10, line 2, change "rotating" to --rotation--.

Claim 7, column 10, line 25, change ";" to --:--.

Claim 7, column 10, line 30, change "provide" to --provided--.

On the title page, Item [54], line 1 change "CORRECTIONS" to --CORRECTION--.

On the title page, Item [54], line 3, change "PROVIDINES" to --PROVIDED --.

Signed and Sealed this

Nineteenth Day of October, 1993

Attest:

BRUCE LEHMAN

Attesting Officer        Commissioner of Patents and Trademarks